United States Patent
Jang et al.

(10) Patent No.: US 9,464,817 B2
(45) Date of Patent: Oct. 11, 2016

(54) HUMIDIFIER

(71) Applicant: LG ELECTRONICS INC., Seoul (KR)

(72) Inventors: Joonho Jang, Seoul (KR); Kunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 181 days.

(21) Appl. No.: 14/526,907

(22) Filed: Oct. 29, 2014

(65) Prior Publication Data

US 2015/0115482 A1    Apr. 30, 2015

(30) Foreign Application Priority Data

Oct. 29, 2013  (KR) ........................ 10-2013-0128935

(51) Int. Cl.
| | |
|---|---|
| *F24F 6/00* | (2006.01) |
| *G01F 23/24* | (2006.01) |
| *F24F 11/00* | (2006.01) |
| *F24F 6/16* | (2006.01) |
| *F24F 6/06* | (2006.01) |

(52) U.S. Cl.
CPC ............. *F24F 11/0008* (2013.01); *F24F 6/00* (2013.01); *F24F 6/16* (2013.01); *G01F 23/24* (2013.01); *F24F 2006/008* (2013.01); *F24F 2006/065* (2013.01)

(58) Field of Classification Search
CPC ........ F24F 6/00; F24F 6/06; F24F 2006/008; F24F 2006/065; G01F 23/24
USPC ....... 261/30, 72.1, 81, 83, 91, 92; 73/290 R, 73/304 C, 304 R
See application file for complete search history.

(56) References Cited

U.S. PATENT DOCUMENTS

| | | | |
|---|---|---|---|
| 6,078,729 A | 6/2000 | Kopel | |
| 8,789,414 B2 * | 7/2014 | Park | ...................... G01F 23/265 73/149 |
| 2007/0152356 A1 | 7/2007 | Huang | |

FOREIGN PATENT DOCUMENTS

| | | |
|---|---|---|
| EP | 2 472 193 A2 | 7/2012 |
| KR | 10-2011-0113263 A | 10/2011 |

OTHER PUBLICATIONS

European Search Report issued in Application No. 14188961.8 dated Mar. 25, 2015.

* cited by examiner

*Primary Examiner* — Robert A Hopkins
(74) *Attorney, Agent, or Firm* — KED & Associates LLP

(57) ABSTRACT

A humidifier may be provided that includes a tray in which water is stored, a detection plate disposed on the tray to contact the water stored in the tray, and a case assembly including a contact plate contacting the detection plate and a water level detection part connected to the contact plate to detect a water level within the tray based on capacitance of the detection plate.

20 Claims, 11 Drawing Sheets

HUMIDIFIER

CROSS-REFERENCE TO RELATED APPLICATION

The present application claims priority under 35 U.S.C. 119 and 35 U.S.C. 365 to Korean Patent Application No. 10-2013-0128935, filed Oct. 29, 2013, the subject matter of which is hereby incorporated by reference.

BACKGROUND

Humidifiers are devices for discharging moisture contained in air to raise humidity in the air. Humidifiers may be classified as ultrasonic humidifiers using ultrasonic vibration and natural vaporizing humidifiers in which flowing air contacts moisture to allow the air to contain the moisture.

Korean Patent Publication No. 2011-0113263, the subject matter of which is incorporated herein by reference, discloses a water level detection device.

The water level detection device (of the humidification air cleaner) includes a water level detection rod provided in a wall of a water tank. The water level detection rod detects a water level based on capacitance.

According to the water level detection device for the above-described humidification air cleaner, since the water level rod is disposed at a predetermined height, it may be difficult to detect a water level except for the water level having a predetermined height.

Since a hole has to be defined in the wall of the water tank to connect a sensor for detecting capacitance of the water level detection rod to the water level detection rod, a structure for sealing may be required. Additionally, if the sealing is not completely realized, then the water may leak.

BRIEF DESCRIPTION OF THE DRAWINGS

Arrangements and embodiments may be described in detail with reference to the following drawings in which like reference numerals refer to like elements and wherein.

DETAILED DESCRIPTION

Reference may now be made in detail to embodiments, examples of which are illustrated in the accompanying drawings.

In the following detailed description of preferred embodiments, reference is made to the accompanying drawings that form a part hereof, and in which is shown by way of illustration specific preferred embodiments. These embodiments may be described in sufficient detail to enable those skilled in the art to practice the embodiment, and it is understood that other embodiments may be utilized and that logical structural, mechanical, electrical, and chemical changes may be made without departing from the spirit or scope of the embodiment. To avoid detail not necessary to enable those skilled in the art to practice the embodiment, the description may omit certain information known to those skilled in the art The following detailed description is, therefore, not to be taken in a limiting sense.

Figure 1:
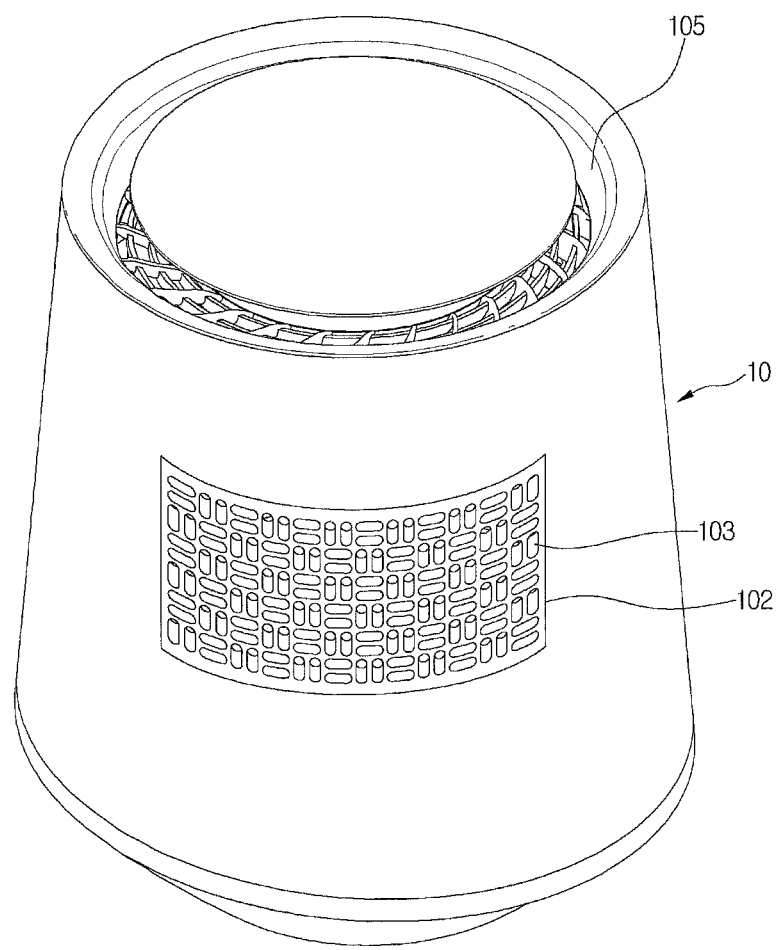
FIG. 1 is a perspective view of a humidifier according to an example embodiment.
Figure 2:
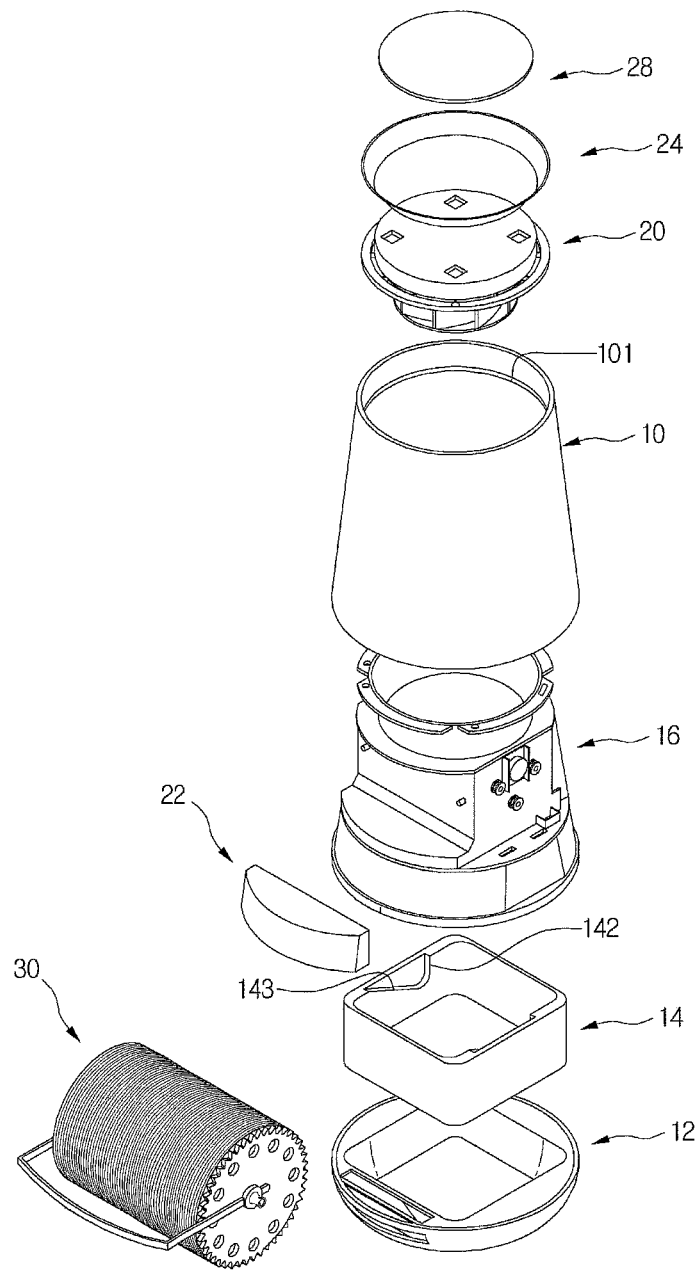
FIG. 2 is an exploded perspective view of a humidifier according to an example embodiment.

FIG. 1 is a perspective view of a humidifier according to an example embodiment. FIG. 2 is an exploded perspective view of a humidifier according to an example embodiment. Other embodiments and configurations may also be provided.

Referring to FIGS. 1 and 2, a humidifier 1 may include a main body and a base 12 on which the main body is seated. The main body may include a housing 10 defining an exterior thereof.

The main body may include a tray 14 in which water is stored, a case assembly 16 for guiding a flow of air within the housing 10, a fan motor assembly 20 for blowing the air, a control unit 22 for controlling operation of the humidifier 1, a deco member 24 coupled to an upper portion of the housing 10, an input panel 28 seated on an upper portion of the fan motor assembly 20 to receive a manipulation command of the humidifier 1, and a tray assembly seated on the tray 14.

The main body may also include a discharge part 105 through which humidified air is discharged. The discharge part 105 may have a closed loop shape when viewed from a top surface of the main body. For example, the discharge part 105 may have a circular ring shape. Other shapes may also be provided.

The housing 10 has an opened upper portion and an upper lower portion. The housing 10 includes an upper opening and a lower opening.

The housing 10 includes a suction grill 102 having a second suction part through which air is introduced. The suction grill 102 may be separably coupled to the housing 10.

The upper opening of the housing 10 may provide a passage through which the humidified air passes.

A seat end 101 on which the fan motor assembly 20 is disposed on an upper portion of an inner circumferential surface of the housing 10.

An inner structure of the humidifier 1 may be described in more detail.

Figure 3:
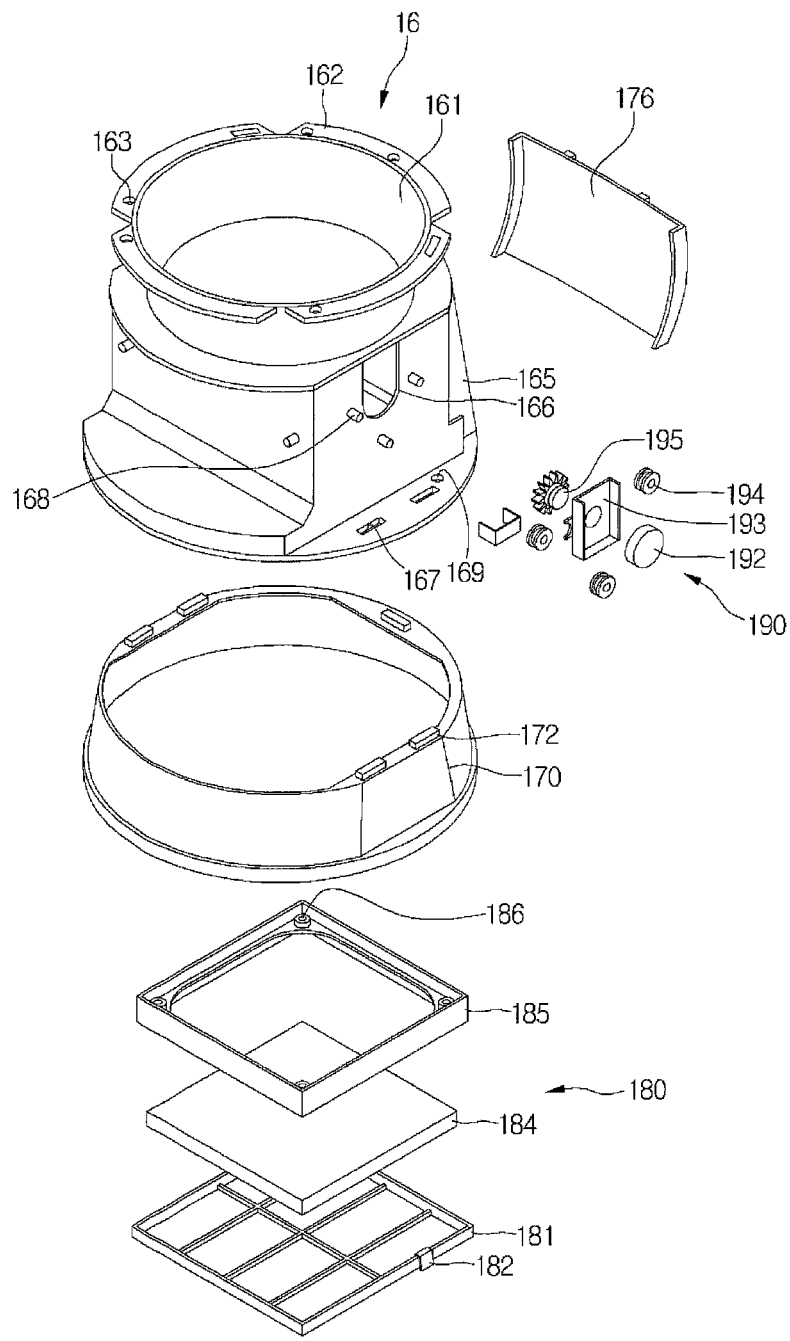
FIG. 3 is an exploded perspective view of a case assembly according to an example embodiment.

FIG. 3 is an exploded perspective view of a case assembly according to an example embodiment. Other embodiments and arrangements may also be provided.

Referring to FIG. 3, the case assembly 16 may include an upper case 161 that serves as a fan housing, a middle case 165 disposed under the upper case 161 to guide the humidified air to the upper case 161, and a lower case 170 disposed under the middle case 165 and seated on the base 12.

The upper case 161 and the middle case 165 may be integrated together (i.e., with each other). The lower case 170 may be separably coupled to the middle case 165. For example, the upper case 161 and the middle case 165 may be separably coupled to each other, and the middle case 165 and the lower case 170 may be integrated together (i.e., with each other). Alternatively, the upper case 161, the middle case 165, and the lower case 170 may be integrated together (i.e., with each other) or may be separately provided and then coupled to each other.

A coupling part 162 may horizontally extend from an upper end of the upper case 161, and a coupling hole 163 may be defined in the coupling part 162. The coupling part 162 may be coupled to the fan motor assembly 20.

The coupling part 162 may be seated on and supported by the seat end 101 (of the housing 10) in a state where the coupling part 162 is accommodated into the housing 10.

The control unit 22 may be disposed on the middle case 165. The disk motor assembly 190 may be disposed on the middle case 165.

The disk motor assembly 190 may include a disk motor 192 generating power for rotating the disk assembly 30, a motor bracket 193 disposed on the disk motor 192, and a transmission part 195 connected to the disk motor 192 to transmit the power of the disk motor 192 to the disk assembly 30.

A buffer member 194 may be coupled to the motor bracket 193. A protrusion 169 inserted into the buffer member 194 may be disposed on the middle case 165.

Since the buffer member 194 coupled to the motor bracket 193 is coupled to the middle case 165, vibration generated while the disk motor 192 operates may be absorbed by the buffer member 194 to minimize transmission of vibration to the middle case 165.

The transmission part 195 may include at least one gear, for example. An opening 166 through which the transmission part 195 passes may be defined at the middle case 165. When the disk motor assembly 190 is disposed on the middle case 165, the transmission part 195 may pass through the opening 166 and may then be disposed in the middle case 165.

An insertion hole 167, in which an insertion part 172 of the lower case 170 is inserted, may be defined under the middle case 165.

An air guide 176 for guiding the air suctioned through the second suction part 103 may be coupled to the middle case 165. A hole, in which a portion of the air guide 176 is inserted, may be defined in a side surface of the middle case 165. Thus, air suctioned through the second suction part 103 may pass through the hole by the air guide 176 and may then be introduced into the middle case 165.

A filter assembly 130 may be disposed on the case assembly 16. The filter assembly 180 may be coupled to the middle case 165 within the case assembly 16, for example.

The filter assembly 180 may include a filter frame 181 on which a filter 184 is seated, and a filter case 185 coupled to the filter frame 181.

At least one hook 182 coupled to the filter case 185 may be disposed on the filter frame 181. At least one coupling boss 186 coupled to the middle case 165 may be disposed on the filter case 185.

Figure 4:
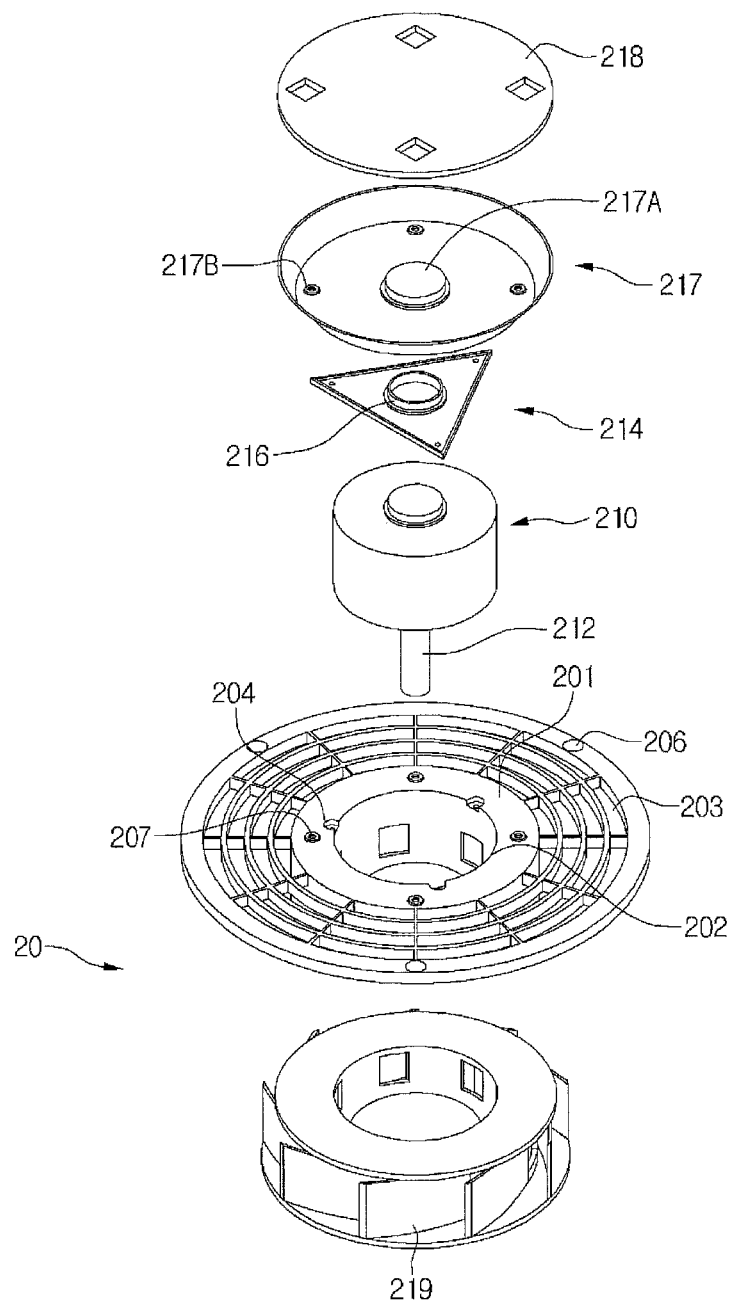
FIG. 4 is an exploded perspective view of a fan motor assembly according to an example embodiment.

FIG. 4 is an exploded perspective view of a fan motor assembly according to an example embodiment. Other embodiments and arrangements may also be provided.

Referring to FIG. 4, the fan motor assembly may include a fan motor 210, a motor support 201 on which the fan motor 210 is seated, a fan 219 coupled to a shaft 212 of the fan motor 210, a motor pressing part 214 coupled to the motor support 201 to press the fan motor 210, and thereby prevent the fan motor 210 from vibrating, a guide 217 seated on the motor pressing part 214 and coupled to the motor support 201, and a cover 218 seated on an upper portion of the guide 217.

A motor accommodation part 202, in which the fan motor 210 is accommodated, may be disposed in the motor support 201. The motor support 201 may include one or more holes 203 through which the humidified air passes.

The shaft 212 (of the fan motor 210) may pass through the motor accommodation part 202 in a state where the shaft 212 (of the fan motor 210) is accommodated in the motor accommodation part 202, and the fan 219 may be coupled to the shaft 212 of the fan motor 210 at a lower side of the motor support 201.

The motor support 210 may include a seat groove 204 on which the motor pressing part 214 is seated, a first coupling hole 206 to which a coupling member coupled to the upper case 161 is coupled, and a second coupling hole 207 to which a coupling member coupled to the guide 217 is coupled.

A first accommodation part 216, in which a portion of the fan motor 210 is accommodated, may be disposed in the motor pressing part 214.

A second accommodation part 217A in which the first accommodation part 216 of the motor pressing part 214 is accommodated, may be disposed in the guide 217. A coupling hole 217B, to which a coupling member coupled to the motor support 210 is coupled, may be defined in the guide 217.

Figure 5:
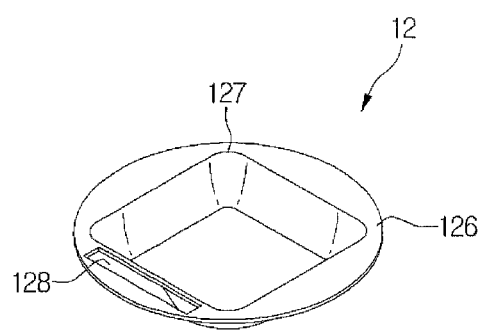
FIG. 5 is an exploded perspective view of a base according to an example embodiment.
Figure 5:
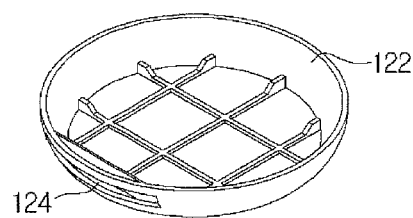

FIG. 5 is an exploded perspective view of a base according to an example embodiment. Other embodiments and arrangements may also be provided.

Referring to FIG. 5, the base 12 may include a lower base 122 and an upper base 126 seated on the lower base 122.

The base 12 includes first suction parts 124 and 128 through which air is suctioned. The first suction parts 124 and 128 may include a first hole 124 defined in the lower base 122, and a second hole 128 defined in the upper base 126.

A tray accommodation part 127, in which a portion of the tray 14 is accommodated, may be disposed in the upper base 126.

Although the base 12 is constituted by two members, embodiments are not limited thereto. For example, the base 12 may be provided as a single member.

Figure 6:
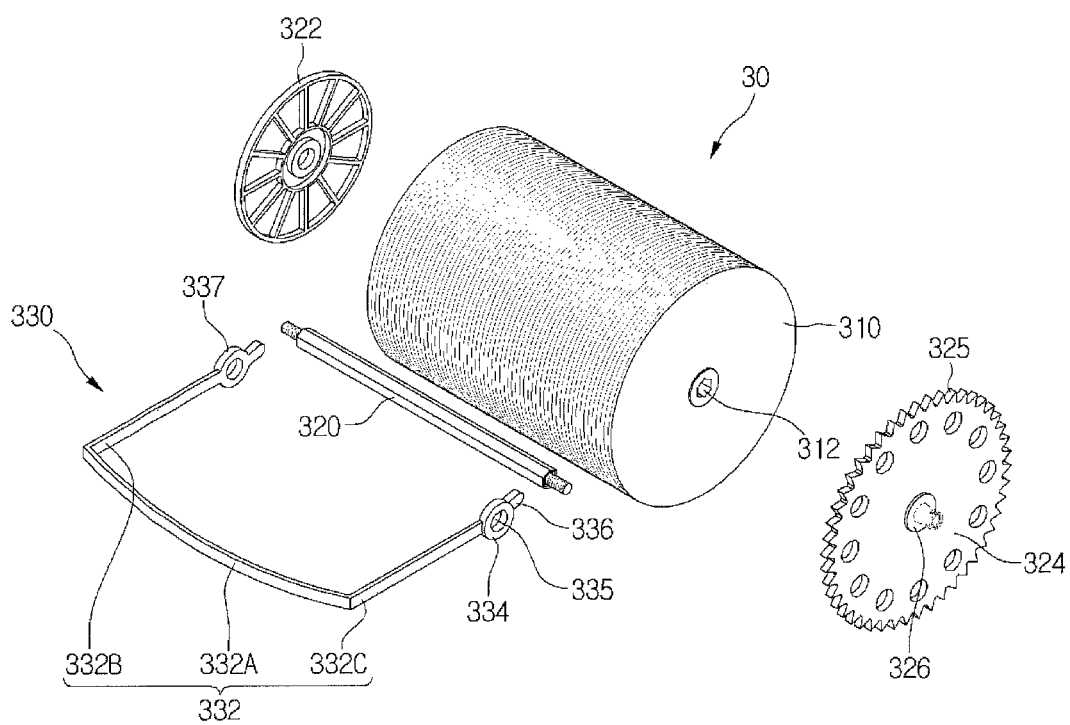
FIG. 6 is an exploded perspective view of a disk assembly according to an example embodiment.
Figure 7:
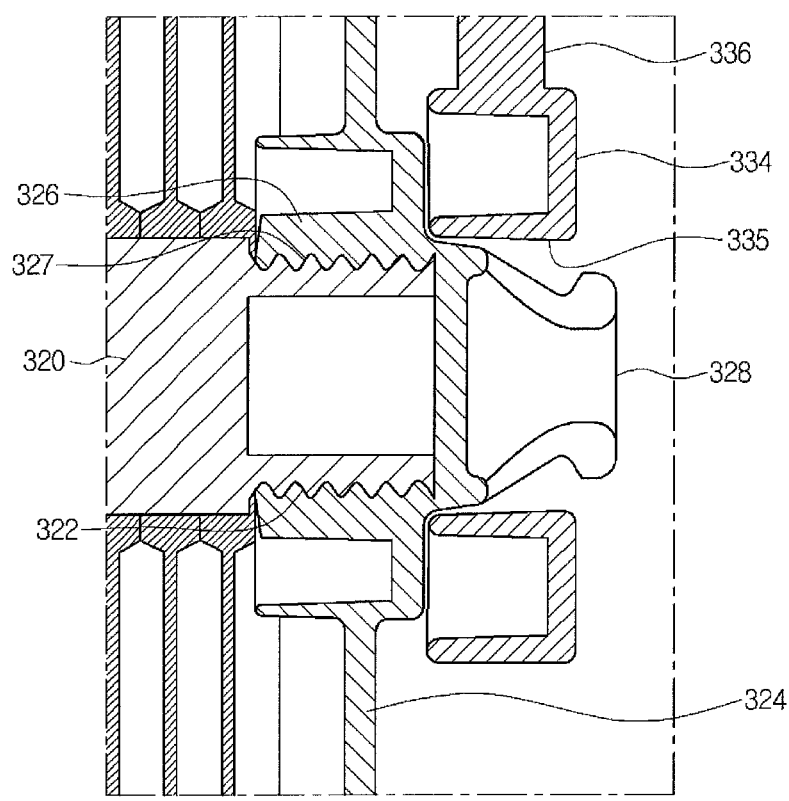
FIG. 7 is a cross-sectional view of a disk assembly according to an example embodiment.

FIG. 6 is an exploded perspective view of a disk assembly according to an example embodiment. FIG. 7 is a cross-sectional view of a disk assembly according to an example embodiment. Other embodiments and configurations may also be provided.

Referring to FIGS. 2, 6, and 7, the disk assembly 30 may include a plurality of stacked disks 310, a shaft 320 passing through the plurality of disks 310 at a same time, a first disk cover 322 coupled to a first side of the shaft 320 at a first side of the plurality of disks 310, a second disk cover 324 coupled to a second side of the shaft 320 at a second side of the plurality of disks 310, and a handle 330 coupled to the first and second disk covers 322 and 324.

Each of the plurality of disks 310 may have a circular plate shape, for example, and may have a shaft hole 312 through which the shaft 320 passes.

The shaft 320 may have a non-circular cross-section, for example. The shaft hole 312 may have the same cross-sectional shape as the shaft 320. Thus, the plurality of disks 310 may rotate together with the shaft 320 based on rotation of the shaft 320.

The second disk cover 324 may include a shaft coupling part 326 to which the other end of the shaft 320 is coupled. An insertion groove 327, in which the shaft 320 is inserted, may be defined in the shaft coupling part 326. A screw thread may be formed on an end of the shaft 320, and a screw thread coupled to the screw thread of the shaft 320 may be formed on an inner circumferential surface of the insertion groove 327.

Accordingly, since the second disk cover 324 and the shaft 320 are screw-coupled to each other, when the second disk cover 324 rotates, the shaft 320 may rotate together with the second disk cover 324.

A handle coupling part 328, coupled to the handle 330, may be disposed on the second disk cover 324. The handle coupling part 328 may include a plurality of hooks spaced apart from each other.

A plurality of gear teeth 325, connected to the transmission part 195 (of the disk motor assembly 190), may be disposed on a circumference of the second disk cover 324.

The first disk cover 322 includes a shaft coupling part and a handle coupling part that have a same structure as the shaft coupling part 326 and the handle coupling part 329, which are disposed on the second disk cover 324. A detailed description with respect to structure of the first disk cover 322 may be omitted.

The handle 330 may include a handle body 332 to be grasped by a user and a pair of cover coupling parts 334 and 337 disposed on both ends of the handle body 332. For example, the handle body 332 may include a first body 332A and a pair of second bodies 332B and 332C that extend from both ends of the first body 332A. The cover coupling parts 334 and 337 may be disposed on the pair of second bodies 332B and 332C, respectively. That is, the handle body 332 may have a " ⌐ " shape, for example.

A coupling hole 335, to which the handle coupling part 328 of each of the disk covers 322 and 324 is coupled, may be defined in each of the cover coupling parts 334 and 337. Since the handle coupling part 328 includes a plurality of hooks, the plurality of hooks may be elastically deformed in directions close to each other while passing through the coupling hole 335. Each of the plurality of hooks may be deformed to return to its original state after passing through the coupling hole 335. Thus, the handle coupling part 328 may be coupled to the cover coupling parts 334 and 337. The handle 330 may relatively rotate with respect to the disk covers 322 and 324 in a state where the handle 330 is coupled to each of the disk covers 322 and 324.

Each of the cover coupling parts 334 and 337 (of the disk assembly 30) may be seated on and supported by the tray 14. A guide protrusion 336 may be disposed on each of the cover coupling parts 334 and 337 such that the handle 330 is seated on the tray 14 in a state where the handle 330 rotates in one direction. The guide protrusion 336 may protrude from each of the cover coupling parts 334 and 337 in a direction that is inclined with respect to an extension direction of the second bodies 332B and 332C. That is, an angle between the guide protrusion 336 and the second bodies 332B and 332C may be greater than or less than an angle of approximately 180°.

The tray 14 may include a first seat groove 142 on which each of the cover coupling parts 334 and 337 is seated, and a second seat groove 143 on which the guide protrusion 336 is completely seated in only a state where the handle 330 rotates in one direction.

When the disk motor 192 operates in a state where the disk assembly 30 is seated on the tray 14, a power of the disk motor 192 may be transmitted to the second disk cover 324 through the transmission part 195. As a result, the second disk cover 324 may rotate in one direction, and thus the shaft 320, the plurality of disks 310, and the first disk cover 322 may rotate in one direction together with the second disk cover 324. The handle 330 may be maintained in the stopped state without rotating in the state where the handle 330 is seated on the seat grooves 142 and 143.

The handle 330 may relatively rotate with respect to the handle 330 in a state where the handle 330 is seated on the tray 14 without the shaft 320 being directly seated on the tray 14. Thus, damage of the tray 14 while the shaft 320 rotates may be prevented. Additionally, since the handle coupling part 328 rotates within a range of the coupling hole 336 of the handle 330, rotation noises may be reduced.

Figure 8:
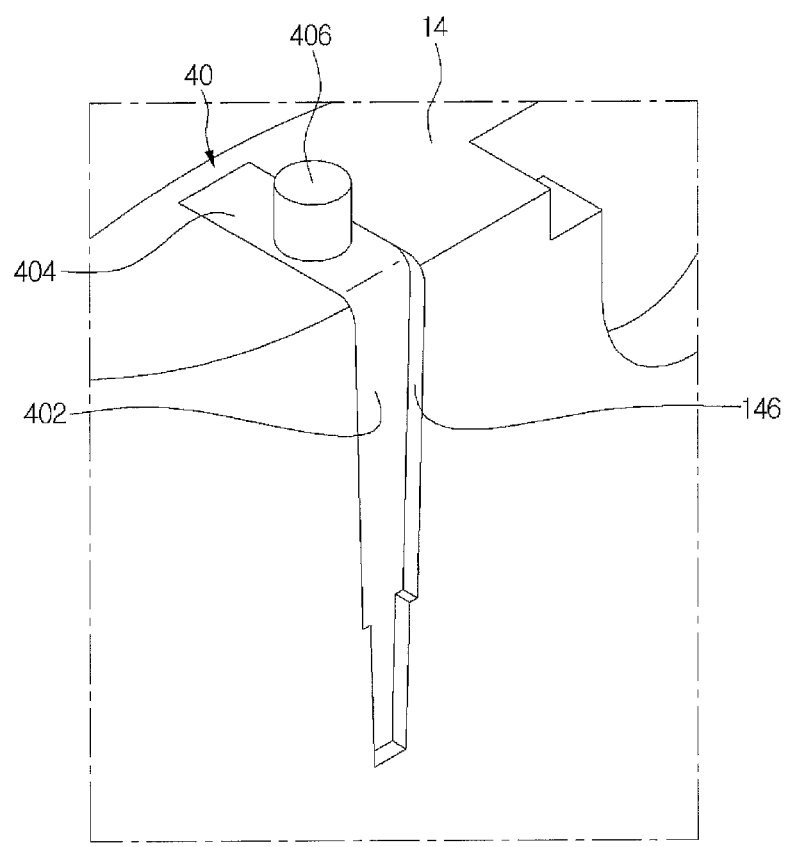
FIG. 8 is a view of a state in which a detection plate for detecting a water level is disposed on a tray according to an example embodiment.
Figure 9:
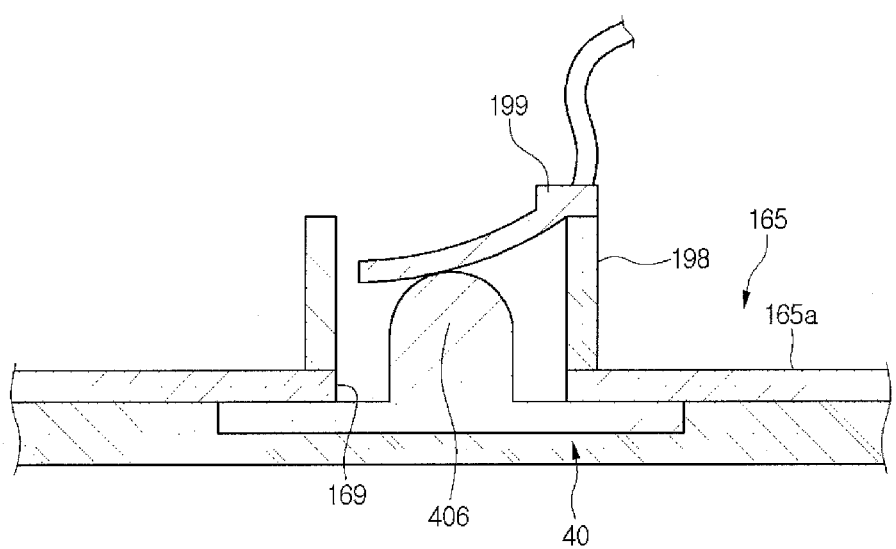
FIG. 9 is a view of a state in which a detection plate of a tray contacts a contact plate of a case assembly.
Figure 10:
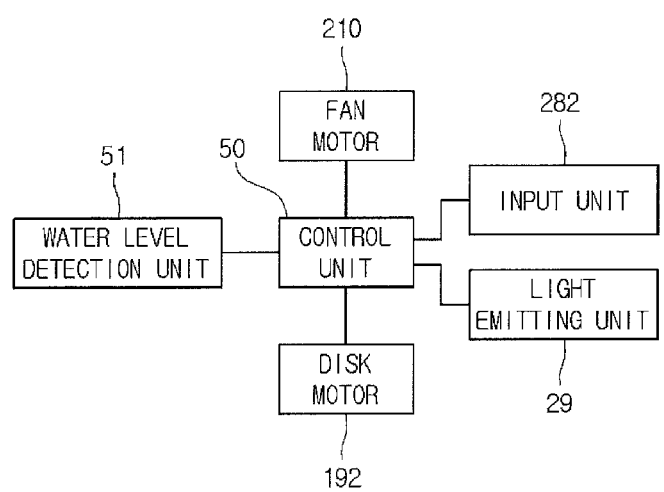
FIG. 10 is a block diagram illustrating a process of controlling a humidifier according to an example embodiment.

FIG. 8 is a view of a state in which a detection plate for detecting a water level is disposed on a tray according to an example embodiment. FIG. 9 is a view of a state in which a detection plate of a tray contacts a contact plate of a case assembly. FIG. 10 is a block diagram illustrating a process of controlling a humidifier according to an example embodiment. Other embodiments and configurations may also be provided.

Referring to FIGS. 8 to 10, the humidifier 1 may include a water level detection unit 51 for detecting a water level, and a control unit 50 for controlling the fan motor 210 and the disk motor 192 based on information of the water level detected by the water level detection part 51.

The humidifier 1 may further include an input unit 282 for receiving an operation command and a light emitting unit 29 for emitting light.

A detection plate 40 for contacting water may be disposed on the tray 14.

The detection plate 40 may include a first plate 402 that vertically extends within the tray 14, and a second plate 404 that horizontally extends from an upper end of the first plate 102. A contact protrusion 406 may disposed on the second plate 404. The first plate 402 and the contact protrusion 406 may be integrated together (i.e., with each other) or may be separably connected to each other. Each of the first plate 402 and the contact protrusion 406 may be formed of a metal material.

A seat groove 146, into which the detection plate 40 is seated, may be defined in the tray 14. The seat groove 146 may have a shape corresponding to a shape of the detection plate 40. Thus, the first plate 402 may be seated on an inner wall of the tray 14, and the second plate 404 may be seated on a top surface of the tray 14. The seat groove 146 may be defined in the tray. The seat groove 146 may receive the first plate 402 and the second plate 404.

An insertion part, in which the contact protrusion 406 is inserted, may be defined in the tray 14 to prevent the detection plate 40 from being separated from the tray 14 when the detection plate 40 is seated in the seat groove 46. Alternatively, a separation prevention protrusion may be provided for preventing the detection plate 40 from being separated from the seat groove 146 when the detection plate 40 is seated in the seat groove 146. Alternatively, the detection plate 40 may be integrated with the tray 14 through an inserting injection mold process.

A hole 169, through which the contact protrusion 406 passes, may be defined in the middle case 165 (of the case assembly 16). For example, the middle case 165 may have a seat surface 165a seated on an upper portion of the tray 14, and the hole 169 may be defined by the seat surface 165.

A contact plate 199, contacting the contact protrusion 406 that passes through the hole 169, may be disposed on the middle case 165. The contact plate 199 may be supported by the support 198. The contact plate 199 may be elastically deformed when the contact plate 199 is supported by the support 198.

When the case assembly 16 is seated on the base 12, the contact protrusion 406 passes through the hole 169 to contact (or press) the contact plate 199. As a result, the contact plate 199 may be elastically deformed, and the contact state between the contact plate 199 and the contact protrusion 406 may be maintained in a state where the contact plate 199 is elastically deformed. The water level detection part 51 may be connected to the contact plate 199. In a state where the contact protrusion 406 passes through the hole 169, the contact protrusion 406 may be disposed outside the case assembly 16. The water level detection part 51 may be disposed outside the case assembly 16.

When water contacts the detection plate 40, the water level detection part 51 may detect a water level within the tray 14 based on capacitance of the detection plate 40.

Since the first plate 402 (of the detection plate 40) vertically extends, a water level may be continuously detected. The control unit, described below, may control a display unit so that the display unit displays the water level in stages. The display unit may be disposed on the input panel.

Since the contact protrusion 406 contacts the contact plate 199 disposed on the case assembly 16, a hole for installing the detection plate 40 on the tray 14 may be unnecessary to prevent water from leaking.

Additionally, since the contact protrusion 406 contacts the contact plate 199 when the contact protrusion 406 presses and deforms the contact plate 199, the contact state therebetween may be stably maintained to improve detection reliability.

Additionally, the input unit 282 may be disposed on the input panel 28. For example, the input unit 282 may receive a command by a user's touch manipulation. The light emitting unit 29 may also be disposed on the input panel 28.

Figure 11:
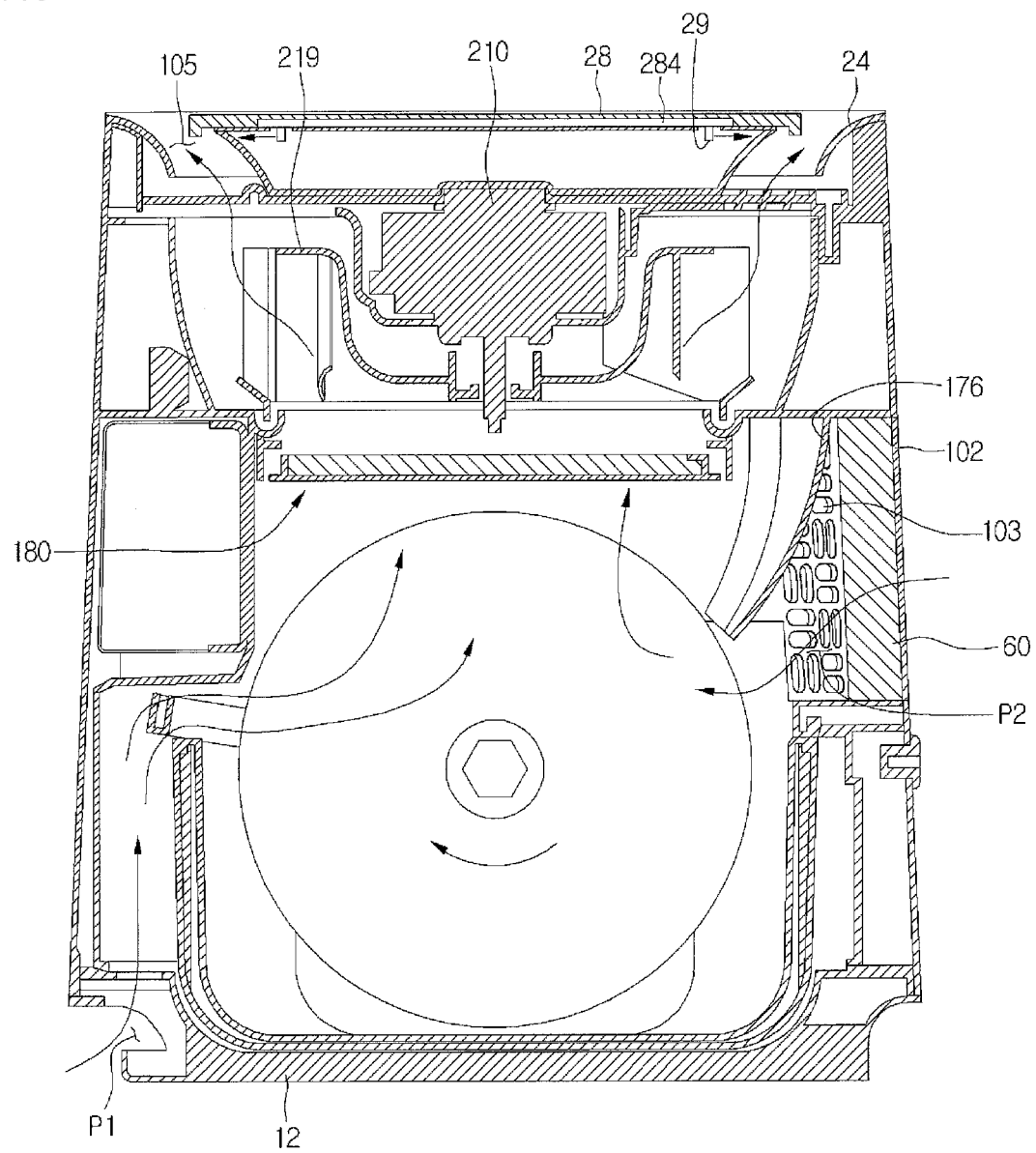
FIG. 11 is a cross-sectional view of a humidifier according to an example embodiment.

FIG. 11 is a cross-sectional view of a humidifier according to an example embodiment. Other embodiments and configurations may also be provided.

A process of assembling the humidifier may be described with reference to FIG. 11.

The tray 14 is seated on the base 12.

The disk assembly 30 may be seated on the tray 14. As described above, the handle 330 may be seated on the tray 14 in the disk assembly 30. More particularly, the handle may be seated on the tray 14 only in the state where the handle 330 rotates in one direction.

When the disk assembly 30 is seated on the tray 14, the plurality of disks 310 may be spaced apart from a bottom surface of the tray 14. A portion of the plurality of disks 310 may protrude to outside of the tray 14.

The case assembly 16 may be seated on the base 12.

When the case assembly 16 is seated on the base 12, the lower case 170 may cover the tray 14, and the middle case 165 may cover the plurality of disks 310 that protrude to outside of the tray 14. A lower end of the air guide 176 coupled to the middle case 165 may be disposed adjacent to the plurality of disks 310. The lower end of the air guide 176 may be disposed higher than the shaft 320 (of the disk assembly 30).

When the case assembly 16 is seated on the base 12, the transmission part 195 (of the disk motor assembly 190) may be engaged with the second disk cover 324 (of the disk assembly 30).

When the case assembly 16 is seated on the base 12, a portion of the middle base 164 may be seated on the tray 14. The contact protrusion 406 of the detection plate 40 disposed on the tray 14 may press and contact the contact plate 199 disposed on the case assembly 16.

When the case assembly 16 is seated on the base 12, the filter assembly 180 may be disposed above the disk assembly 30.

The control unit 22 may be coupled to the case assembly 16. The case assembly 16 may be seated on the base 12 in a state where the control unit 22 is coupled to the case assembly 16.

The housing 10 may be seated on the base 12.

The fan motor assembly 20 is accommodated into the housing 10 from an upper side of the housing 10, and the fan motor assembly 20 is coupled to the housing 10 and the upper case assembly 16.

The seat end 101 (of the housing 10) is seated on the coupling part 162 (of the case assembly 16), and the fan motor assembly 20 is seated on the coupling part 162. The fan motor assembly 20 may be coupled to the seat end 101 and the coupling part 162 by a single coupling member.

The housing 10, the case assembly 16 and the fan motor assembly 20 may be separated from the base 12 as one module. That is, the main body may be separated from the base 12 as one module.

The deco member 24 is coupled to an upper portion of an inner circumferential surface of the housing 10, and the input panel 28 is coupled to an upper portion of the fan motor assembly 20 to complete assembly of the humidifier.

The fan motor assembly 20 may be coupled to the housing 10 after the input panel 28 is coupled to the fan motor assembly 20.

A process of separating the filter assembly 180 may now be described.

To clean the filter assembly 180 or the fan 219, the main body may be separated from the base 12.

Since the housing 10 is coupled to the case assembly 16 and the fan motor assembly 20, the case assembly 16, the fan motor assembly 20 and the housing 10 may be separated from the base 12 at a same time.

The filter assembly 180 is disposed under the fan 219. That is, the filter assembly 180 may be disposed between the fan 219 and the disk assembly 30.

When the main body is separated from the base 12, a state in which the tray 14 is seated on the base 12 may be maintained. The state in which the disk assembly is seated on the tray 14 may be maintained.

When the main body is separated from the base 12, the filter assembly 180 may be exposed to the outside. A user may separate the filter assembly 180 from the case assembly 16 to clean the filter 184.

When the filter assembly 180 is separated from the case assembly 16, the fan 219 may be exposed. Thus, the user may clean the fan 219 that is exposed to the outside in a state where the filter assembly 180 is separated from the case assembly 16.

When the housing 10 is separated from the base 12, and the filter assembly 180 is separated from the case assembly 16, the fan 219 is exposed. Thus, since the user cleans the fan without separating the fan 219, a user's convenience may be improved.

A flow of air within the humidifier may be described.

The first suction parts 124 and 128 defined in the base 12 may form a first suction passage P1. The tray 14 and the lower case 170 (of the case assembly 16) may be spaced apart from each other to form a portion of the first suction passage P1.

The suction grill 102 and the air guide 176 may be spaced a predetermined distance from each other, and a second suction passage P2 may be defined between the suction grill 102 and the air guide 176. A filter 60 (or suction filter) for filtering suctioned air may be disposed in the second suction passage P2.

The fan 219 may rotate by operation of the fan motor 210, and the disk 310 may rotate by operation of the disk motor 192.

The disk 310 may rotate in a clockwise direction in FIG. 11, for example. When the disk 310 rotates, the disk 310 wetted by water may be exposed to outside of the tray 14.

When the fan 219 rotates, air may be suctioned into the humidifier 1 through the first suction parts 124 and 128 and the second suction part 103. That is, the air may be suctioned by passing through the base 12, and also the air may be suctioned by passing through the housing 10.

Since the filter 60 is disposed in the second suction passage P2, the filter 60 may serve as air flow resistance in the suction passage P2.

Thus, in case of the humidifier 1, an amount of air suctioned through the first suction parts 124 and 128 in the air introduced into the humidifier 1 may be greater than an amount of air suctioned through the second suction part 102.

The air suctioned through the first suction parts 124 and 128 may flow upward along the first suction passage P1 to flow into a space between the wetted disks 310. Thus, the air may contain moisture while contacting the disks 410.

The first suction parts 124, 128 may be defined in the base 12 to effectively prevent the air from being introduced into the humidifier 1 through the first suction part 124, 128, thereby preventing the inside of the humidifier from being contaminated.

The air suctioned through the second suction part 102 may pass through the filter 60 to flow toward the disk assembly 30 by the air guide 176. The air suctioned through the second suction part 102 may contain moisture while flowing into the space between the wetted disks 310 to contact the disks 410.

The second suction part 103 may be defined in the suction grill 102 to primarily prevent foreign substances from being introduced by the suction grill 102. The filter 60 may be disposed inside the suction grill 102 to secondarily prevent foreign substances from being introduced by the filter 60. Thus, contamination of inside of the humidifier due to introduction of the foreign substance may be prevented.

Since the second suction part 103 is defined in a portion of the housing 10, and a user is capable of seeing the first suction part, the humidifier 1 may be improved in a sense of beauty.

The humidified air may be filtered while passing through the filter assembly 180. After the humidified air passes through the fan 219, the air may be guided by the upper case 161 (of the case assembly 16) to flow upward.

The humidified air may pass through the one or more holes 203 of the fan motor assembly 20 and may then be discharged from the humidifier 1 through the discharge part 105 defined between the deco member 24 and the guide 217.

Since the discharge part 105 has the closed loop shape, the humidified air may be discharged in all directions (i.e., at approximately 360°), and thus may be uniformly spread into the indoor space.

Since the deco member 24 and the guide 217 define the discharge part 105 to guide the discharge of the air, the deco member 24 may be called a first guide, and the guide 217 may be called a second guide.

An operation of the light emitting unit 29 may now be described.

The input unit 282 may include a printed circuit board 284 on which the light emitting unit 29 is mounted. The light emitting unit 29 may pass through the cover 218 (of the fan motor assembly 20) and may then be disposed within the guide 217. The light emitting unit 29 may include a plurality of light emitting diodes (LEDs) that emit light having various colors. The cover 218 (of the fan motor assembly 20) may be omitted. In this example, the input panel 28 may serve as the cover 218.

At least one humidification mode may be selected by the input unit 282. A lighting mode may be selected by the input unit 282.

When the lighting mode is selected, the control unit 50 may turn the light emitting unit 29 on in a state where the fan motor 210 and the disk motor 192 are stopped in operation. The light emitting unit 29 may emit light having a first color. Since the user is capable of selecting the lighting mode, the humidifier may serve as a lighting apparatus.

The control unit 50 may control the light emitting unit 29 such that the light emitting unit 29 emits light having a color different from the first color according to the selected humidification mode. The light emitting unit 29 may emit light having a single color. The control unit 50 may control the light emitting unit 29 such that the light emitting unit 29 emits light having different colors according to the humidification modes.

The light emitting unit 29 may emit light onto the guide 217. The guide 217 may be formed of a transparent or translucent material such that the light emitted from the light emitting unit 29 passes through the guide 217.

The light emitting unit 29 may pass through the guide 217 to emit to the deco member 24. Thus, the light may be emitted from the deco member 24. The deco member 24 may be formed of a transparent or translucent material. The deco member 24 may serve as a reflection plate.

When the humidifier operates, light may be emitted from the light emitting unit 29. Thus, the user may easily recognize that the humidified air is discharging.

Although the light emitting unit 29 is disposed on the input unit 282 inside the guide 217, embodiments are not limited thereto. For example, the light emitting unit 29 may be disposed on the guide 217 or the deco member 24.

Although the deco member 24 is provided as a separate part and then is coupled to the housing 10, embodiments are not limited thereto. For example, the deco member 24 may be integrated with the housing 10.

Embodiments may provide a humidifier that prevents water from leaking due to a structure for detecting a water level and water level detection reliability from being deteriorated.

In at least one embodiment, a humidifier may include a tray in which water is stored; a detection plate disposed on the tray to contact the water stored in the tray; and a case assembly including a contact plate contacting the detection plate and a water level detection part connected to the contact plate to detect a water level within the tray based on capacitance of the detection plate.

In at least another embodiment, a humidifier may include a tray in which water is stored; a detection plate disposed on the tray to contact the water stored in the tray; a case assembly that surrounds the tray; a contact plate disposed on the case assembly to contact the detection plate passing through the case assembly; and a water level detection part connected to the contact plate to detect a water level within the tray based on capacitance of the detection plate.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A humidifier comprising:
   a tray to store water;
   a detection plate, on the tray, to contact the water in the tray; and
   a case assembly including a contact plate and a water level detection part, the contact plate to contact the detection plate, and the water level detection part to couple to the contact plate to detect a water level within the tray based on capacitance of the detection plate.

2. The humidifier according to claim 1, wherein the detection plate includes:
   a first plate to vertically extend within the tray; and
   a second plate to horizontally extend from an upper portion of the first plate, and
   a seat groove defined in the tray, the seat groove to receive the first plate and the second plate.

3. The humidifier according to claim 2, wherein the first plate is on an inner wall of the tray, and
   the second plate is on a top surface of the tray.

4. The humidifier according to claim 2, wherein the detection plate is integrated with the tray by inserting injection molding.

5. The humidifier according to claim 2, wherein a contact protrusion is provided on the second plate.

6. The humidifier according to claim 5, wherein the case assembly includes a hole through which the contact protrusion passes, and
   the contact protrusion passes through the hole to contact the contact plate when the case assembly is on the tray.

7. The humidifier according to claim 6, wherein the contact protrusion is outside the case assembly when the contact protrusion passes through the hole.

8. The humidifier according to claim 6, wherein the case assembly has a seat surface on the tray, and
   the hole is defined by the seat surface.

9. The humidifier according to claim 6, further comprising a support to support the contact plate in the case assembly, wherein the contact plate is elastically deformed by the contact protrusion that passes through the hole, and contact between the contact plate and the contact protrusion is maintained when the contact plate is elastically deformed.

10. The humidifier according to claim 1, further comprising a base to support the tray,
    wherein the case assembly is on the base.

11. The humidifier according to claim 1, wherein a portion of the case assembly surrounds the tray.

12. The humidifier according to claim 1, wherein the case assembly includes a fan for blowing air.

13. A humidifier comprising:
    a tray to store water;
    a detection plate, on the tray, to contact the water in the tray;
    a case assembly to surround portions of the tray;
    a contact plate, on the case assembly, to contact the detection plate that passes through the case assembly; and
    a water level detection part, coupled to the contact plate, to detect a water level within the tray based on capacitance of the detection plate.

14. The humidifier according to claim 13, wherein the case assembly is on the tray, and
    the detection plate contacts the contact plate when the case assembly is on the tray.

15. The humidifier according to claim 14, wherein the detection plate includes a contact protrusion that passes through the case assembly when the case assembly is on the tray.

16. The humidifier according to claim 15, wherein the detection plate includes:
    a first plate to vertically extend from the tray; and
    a second plate bent from an upper end of the first plate, and
    the contact protrusion is on the second plate.

17. The humidifier according to claim 16, wherein the first plate is on an inner wall of the tray, and
    the second plate is on a top surface of the tray.

18. A humidifier comprising:
    a tray;
    a detection plate to contact water in the tray;
    a case assembly to surround portions of the tray;
    a contact plate to contact the detection plate; and
    a water level detection part, coupled to the contact plate, to detect an amount of water within the tray based on the detection plate.

19. The humidifier according to claim 18, wherein the detection plate includes:
    a first plate to extend from the tray;
    a second plate to extend from the first plate; and
    a contact protrusion on the second plate.

20. The humidifier according to claim 19, further comprising a control unit to provide water information based on the detected amount of water.

* * * * *